J. T. UNDERWOOD.
BRICK KILN.
APPLICATION FILED DEC. 22, 1913.

1,105,724.

Patented Aug. 4, 1914.

WITNESSES:
Chas. J. Fitzsimons
L. M. Spencer.

INVENTOR
John T. Underwood.
BY
Edward N. Pagelsen,
ATTORNEY

UNITED STATES PATENT OFFICE.

JOHN T. UNDERWOOD, OF DETROIT, MICHIGAN, ASSIGNOR TO UNDERWOOD ENGINEERING COMPANY, OF DETROIT, MICHIGAN, A CORPORATION OF MICHIGAN.

BRICK-KILN.

1,105,724. Specification of Letters Patent. Patented Aug. 4, 1914.

Application filed December 22, 1913. Serial No. 808,059. REISSUED

*To all whom it may concern:*

Be it known that I, JOHN T. UNDERWOOD, a citizen of the United States, and a resident of Detroit, in the county of Wayne and State of Michigan, have invented a new and Improved Brick-Kiln, of which the following is a specification.

This invention relates to kilns for burning brick, tiles and other earthenware products, and its object is to provide a construction by means of which the articles within the kilns will be evenly and thoroughly burned at minimum cost.

This invention consists in combination with a kiln, either permanent or built up of the articles to be burned, and of fuel and air conduits having openings through which the fuel and air may pass into the kiln, the fuel and air both entering under pressure at all times.

Figure 1:
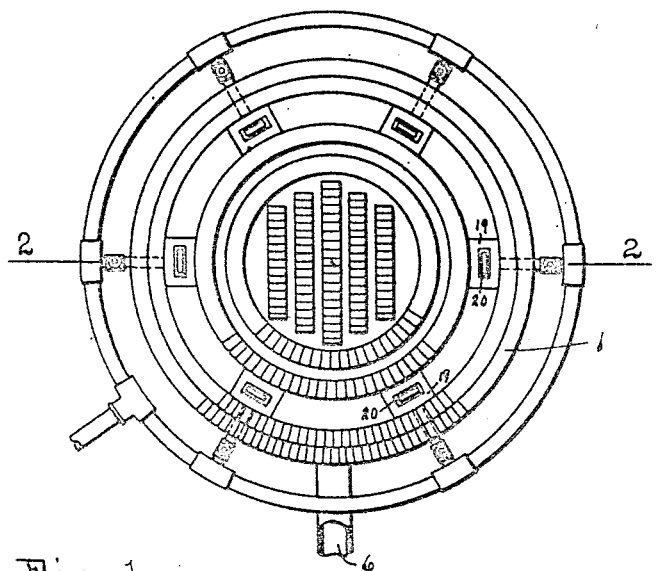
Figure 2:
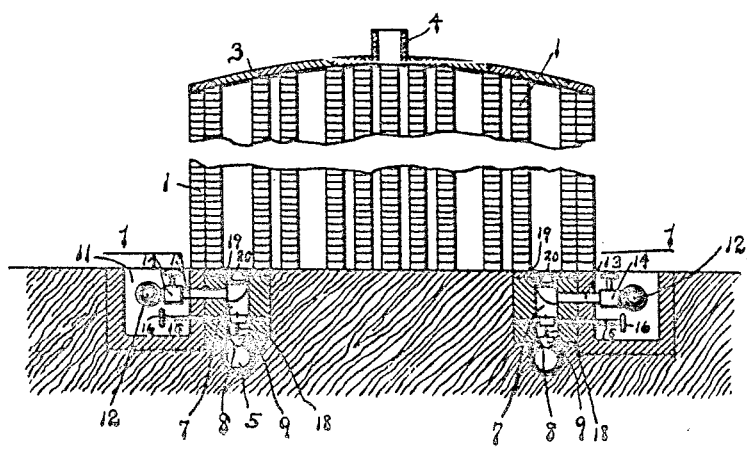

In the accompanying drawing Figure 1 is a horizontal section on the line 1—1 of Fig. 2. Fig. 2 is a vertical section on the line 2—2 of Fig. 1.

Similar reference characters refer to like parts throughout the several views.

In the ordinary brick kilns the burnt gases which carry the heat are caused to pass from the burners between the brick by means of the draft of a chimney or chimneys. The result is that there is less than atmospheric pressure within the kiln and that whenever a crack develops in the outer shell of the bricks which constitute the kiln, air rushes in through such cracks and chills the bricks adjacent such openings and prevents them from burning properly. In the present construction no reliance is placed upon the draft from chimneys, but both air and fuel gas are forced into the kiln under pressure so that the entire interior of the kiln is under pressure at all times. An escape flue is desirable for the exit of the burnt gases. Should any crack occur in the outer shell of the kiln, some of the heated gases within the kiln will escape, but no harm will be done thereby as the bricks adjacent to such an opening will be burned as hard as any others in the kiln.

The kiln shown in the accompanying drawing is merely conventional and of the bee-hive type. It is built up of cylindrical stacks 1 of brick which are separated by proper air spaces, the top of the kiln being closed by means of refractory slabs or bricks 3, and the top may be provided with a discharge flue 4. Extending around below the surface of the ground is shown a gas conduit 5 which may be supplied from the tunnel 6 with gas under pressure. At intervals burner chambers 7 are constructed above the conduit, below which are openings 8 in the top of the conduit 5, which openings may be closed by means of the mushroom valves 9. A pit 11 may be constructed to receive the air main 12, from which the air-pipes 13 extend into the burner chambers, each being provided with a valve 14 whereby the flow of air may be regulated.

Extending from the pit 11 into the burner chambers 7 are the rods 15 having handles 16 on their outer ends. Within the chambers 7 are chains 18 which wind on these rods 15 and connect to the mushroom valves 9 so that these valves can be raised to permit the flow of fuel gas under pressure into the chambers 7 and up through the openings into the kiln. Slabs 19 of refractory material will preferably be used to close the upper end of the burner chambers, which slabs may have openings 20 to permit the discharge of the air and gas into the kiln.

It will therefore be seen that air and gas under pressure enter the kiln and burn at the openings 20. The burnt gases will pass through the different openings left between the bricks in the kiln and finally escape through the discharge flue 4. The pressure within the kiln during the period of burning will always be above that of the atmosphere, and should any cracks occur, no cold air can enter because of this excess pressure.

The sizes, proportions and details of the different parts of the burners, as well as the construction of the oven, may be modified by those skilled in the art without departing from the spirit of my invention set forth in the claims.

I claim:

1. In a kiln having imperforate outer walls, the combination of a series of burner openings within the kiln at the floor level thereof, means for conducting air and gas to said openings under pressure where the gas may be burned, said kiln having means to permit the escape of the burnt gases.

2. In a kiln having imperforate outer walls, the combination of a gas conduit below the floor of the kiln, a series of burner chambers connecting to the conduit and having openings into the kiln, a valve in each chamber to control the flow of gas under pressure into the chamber, an air main, a pipe extending from said main into each burner chamber and adapted to discharge air under pressure into the chamber together with the gas, so that during the burning of the materials in the kiln, the pressure within the kiln shall be above that of the atmosphere.

3. The process of burning bricks which consists in arranging them in proper form in a kiln having imperforate outer walls, with air spaces so as to permit the passage of burnt gases between them, and with an outer coating to prevent the escape of the burnt gases except at proper flues, and then forcing air and gas into the bottom of the kiln under pressure where they may be burned, the pressure within the kiln due to the air and gas entering under pressure serving to prevent the entrance of atmospheric air through any openings in the outer coating.

In testimony whereof I have signed this specification in the presence of two subscribing witnesses.

JOHN T. UNDERWOOD.

Witnesses:
　EDWARD N. PAGELSEN,
　HUGO W. KREINBRING.

Copies of this patent may be obtained for five cents each, by addressing the "Commissioner of Patents, Washington, D. C."